United States Patent
Fujimoto et al.

(10) Patent No.: US 11,888,198 B2
(45) Date of Patent: Jan. 30, 2024

(54) CELL, CELL STACK DEVICE, MODULE, AND MODULE HOUSING DEVICE

(71) Applicant: KYOCERA Corporation, Kyoto (JP)

(72) Inventors: Tetsuro Fujimoto, Kirishima (JP); Makoto Koi, Kirishima (JP); Akihiro Hara, Kirishima (JP); Masahiko Higashi, Kirishima (JP)

(73) Assignee: KYOCERA Corporation, Kyoto (JP)

(*) Notice: Subject to any disclaimer, the term of this patent is extended or adjusted under 35 U.S.C. 154(b) by 631 days.

(21) Appl. No.: 16/972,505

(22) PCT Filed: Jun. 17, 2019

(86) PCT No.: PCT/JP2019/023878
§ 371 (c)(1),
(2) Date: Dec. 4, 2020

(87) PCT Pub. No.: WO2019/240297
PCT Pub. Date: Dec. 19, 2019

(65) Prior Publication Data
US 2021/0273249 A1  Sep. 2, 2021

(30) Foreign Application Priority Data

Jun. 15, 2018  (JP) .................. 2018-114715
Jun. 15, 2018  (JP) .................. 2018-114716

(51) Int. Cl.
*H01M 8/1253* (2016.01)
*H01M 8/2475* (2016.01)

(52) U.S. Cl.
CPC ....... *H01M 8/1253* (2013.01); *H01M 8/2475* (2013.01)

(58) Field of Classification Search
CPC .................. H01M 8/1253; H01M 8/2475
See application file for complete search history.

(56) References Cited

U.S. PATENT DOCUMENTS 9,780,382 B2  10/2017  Hori
2011/0305972 A1*  12/2011  Kobayashi .......... H01M 4/8657
429/496

(Continued)

FOREIGN PATENT DOCUMENTS

EP  2061108 A1  5/2009
EP  2398103 A1  12/2011

(Continued)

OTHER PUBLICATIONS

Tsoga et al., "Gadolinia-doped ceria and yttria stabilized zirconia interfaces: regarding their application for SOFC technology", Acta Materialia., vol. 48, No. 18-19, Nov. 29, 2000, pp. 4709-4714, XP055772553, GB.

(Continued)

*Primary Examiner* — Matthew J Merkling
(74) *Attorney, Agent, or Firm* — Procopio, Cory, Hargreaves & Savitch LLP

(57) ABSTRACT

A cell according to the present disclosure includes: a first electrode layer; a solid electrolyte layer on the first electrode layer, the solid electrolyte layer containing Zr; a middle layer on the solid electrolyte layer, the middle layer containing $CeO_2$ which contains Ce and a rare earth element other than Ce; a second electrode layer on the middle layer; and a boundary region between the solid electrolyte layer and the middle layer, the boundary region including a basing point at which a molarity of Ce and a molarity of Zr are equal. An average molarity of the Ce within a range from the basing point up to 3 μm toward the solid electrolyte layer is equal to or less than 10 mol % with respect to a total of Ce, Zr, and other rare earth elements, an average molarity of Zr within the range is equal to or more than 70 mol % with respect to a total of Ce, Zr, and other rare earth elements, or (Continued)

a molarity ratio of Ce with respect to Zr within the range is equal to or less than 0.143.

10 Claims, 5 Drawing Sheets

(56) References Cited

U.S. PATENT DOCUMENTS

| | | | |
|---|---|---|---|
| 2012/0189939 A1* | 7/2012 | Fujimoto | H01M 8/1253 |
| | | | 429/465 |
| 2016/0164108 A1* | 6/2016 | Matsuno | H01M 4/9025 |
| | | | 264/618 |
| 2018/0212251 A1 | 7/2018 | Imanaka | |
| 2019/0165378 A1* | 5/2019 | Ono | H01M 8/0269 |
| 2019/0372144 A1 | 12/2019 | Inoue et al. | |
| 2019/0386328 A1 | 12/2019 | Inoue et al. | |

FOREIGN PATENT DOCUMENTS

| | | |
|---|---|---|
| EP | 3021393 A1 | 5/2016 |
| JP | 2008-226653 A | 9/2008 |
| JP | 2008-226654 A | 9/2008 |
| JP | 4773588 B1 | 9/2011 |
| JP | 2012-181928 A | 9/2012 |
| JP | 2013-41809 A | 2/2013 |
| JP | 6097873 B1 | 3/2017 |
| JP | 2017-103244 A | 6/2017 |
| JP | 2017-117663 A | 6/2017 |
| JP | 6290471 B1 | 3/2018 |
| WO | 2018/151193 A1 | 8/2018 |

OTHER PUBLICATIONS

Tsoga et al., "Total electrical conductivity and defect structure of $ZrO_2$—$CeO_2$—$Y_2O_3$—$Gd_2O_3$ solid solutions", Solid State Ionics, North Holland Pub. Company., Amsterdam, NL, vol. 135, No. 1-4, Nov. 1, 2000, pp. 403-409, XP004221576.

Uchida et al., "High-performance electrode for medium-temperature solid oxide fuel cells", Journal or the Electrochemical Society, vol. 145, No. 2, Feb. 2, 1998, pp. 615-619, XP002533042.

Constantin et al., Efficiency of a dense thin CGO buffer layer for solid oxide fuel cell operating at intermediate temperature, Solid State Ionics, Elsevier, Aug. 2013, No. 249-250, pp. 98-104.

* cited by examiner

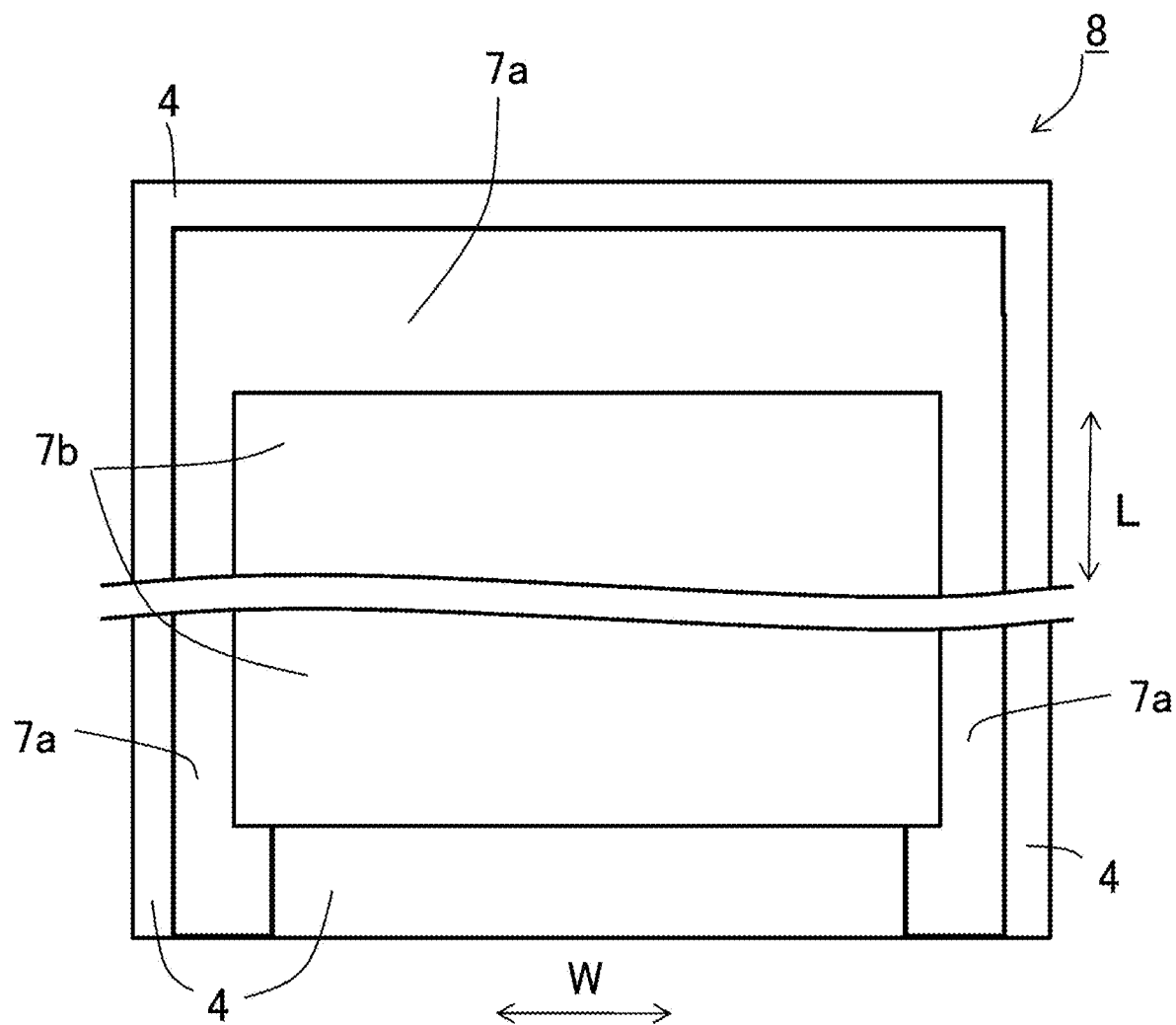

CELL, CELL STACK DEVICE, MODULE, AND MODULE HOUSING DEVICE

FIELD

The present disclosure relates to a cell, a cell stack device, a module, and a module housing device.

BACKGROUND

Recently, as the next generation energy, there has been proposed a cell stack device in which a plurality of fuel battery cells, which is a kind of cell capable of obtaining electric power by using fuel gas (e.g., gas containing hydrogen) and gas containing oxygen (e.g., air), is arranged and fixed to a manifold.

As such a fuel battery cell, there are laminated, on a conductivity support, a fuel electrode layer containing $ZrO_2$ into which Ni and a rare earth element are solid-dissolved, a solid electrolyte layer containing $ZrO_2$ into which a rare earth element is solid-dissolved, and an air electrode layer composed of a perovskite-type composite oxide containing Sr, in this order.

For example, in Patent Literatures 1 and 2, there is proposed a fuel battery cell in which a middle layer composed of $CeO_2$ into which a rare earth element other than Ce is solid-dissolved is arranged between a solid electrolyte layer and an air electrode layer.

CITATION LIST

Patent Literature

Patent Literature 1: Japanese Patent Application Laid-open No. 2008-226653
Patent Literature 2: Japanese Patent Application Laid-open No. 2008-226654

SUMMARY

Solution to Problem

A cell according to the present disclosure includes: a first electrode layer; a solid electrolyte layer on the first electrode layer, the solid electrolyte layer containing Zr; a middle layer on the solid electrolyte layer, the middle layer containing $CeO_2$ which also contains a rare earth element other than Ce; and a second electrode layer on the middle layer, wherein a boundary region between the solid electrolyte layer and the middle layer includes a point at which a molarity of Ce and a molarity of Zr are equal.

A cell stack device according to the present disclosure includes: the above-mentioned plurality of cell; and a cell stack in which the plurality of cells is electrically connected.

A module according to the present disclosure includes: a storage container; and the above-mentioned cell stack device that is housed in the storage container.

A module housing device according to the present disclosure includes: an external case; the above-mentioned module that is housed in the external case; and an auxiliary equipment configured to drive the module.

BRIEF DESCRIPTION OF DRAWINGS

FIG. 3B is a bottom view illustrating a configuration illustrated in FIG. 3A while omitting a part thereof.

DESCRIPTION OF EMBODIMENTS (Cell)

A solid oxide-type fuel battery cell will be explained as one example of a cell constituting a cell stack.

Figure 1A:
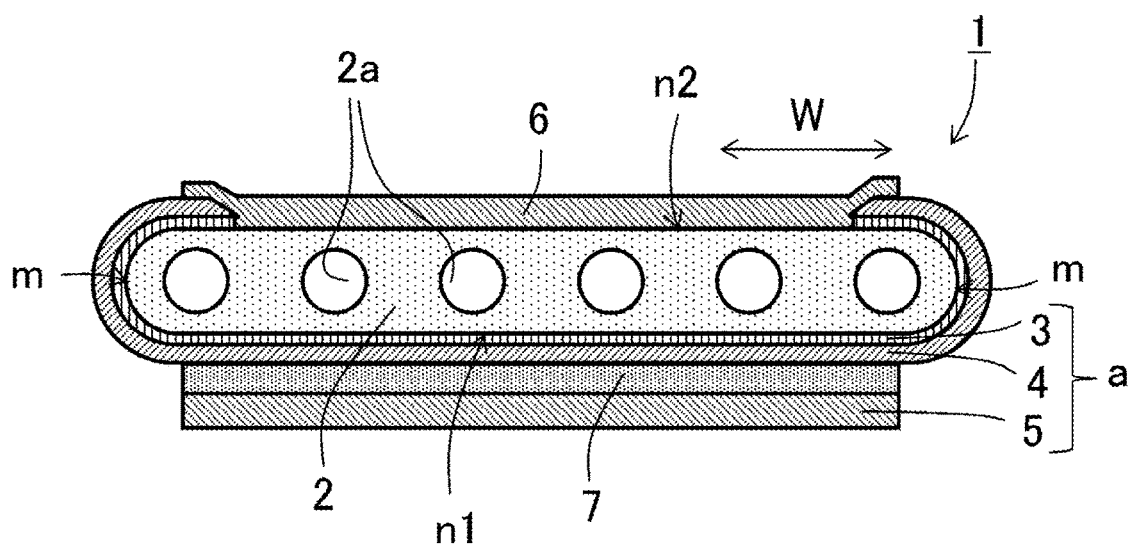
FIG. 1A is a lateral-cross-sectional view illustrating one example of a cell.
Figure 1B:
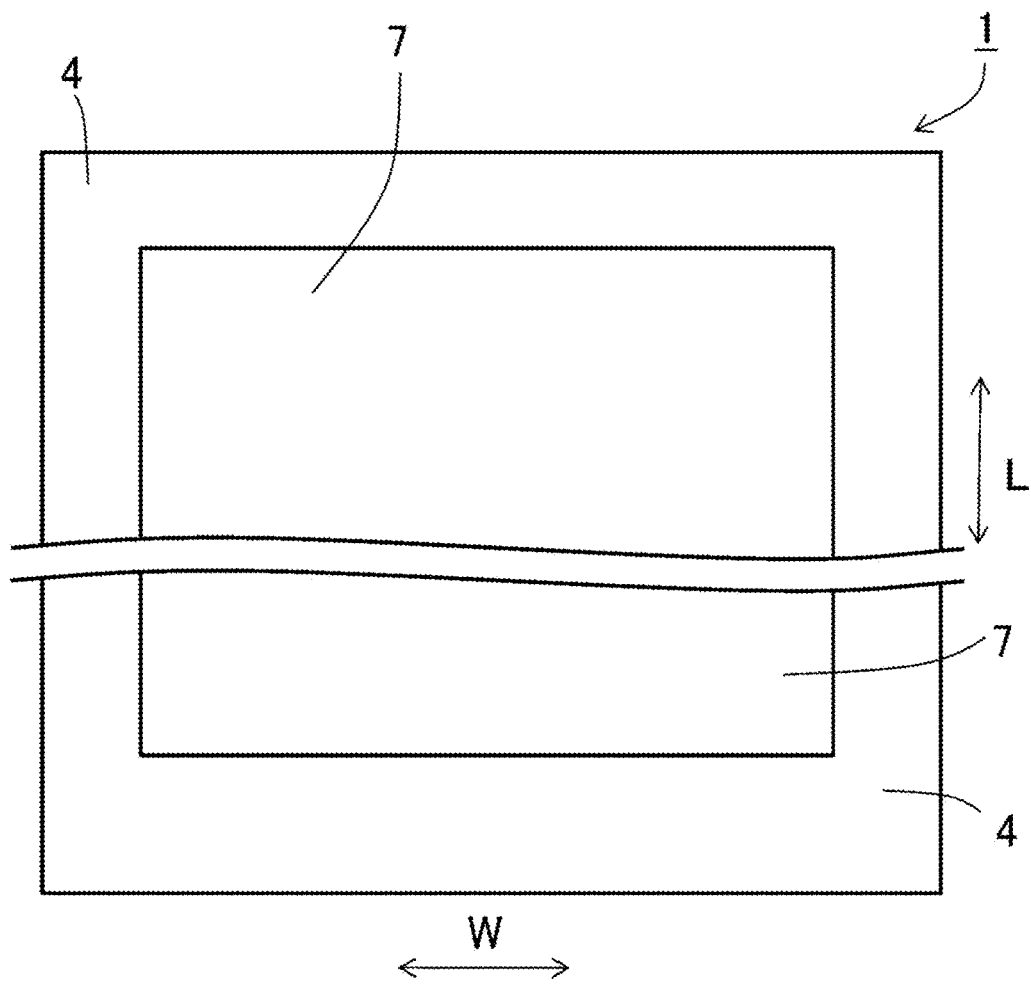
FIG. 1B is a bottom view illustrating a configuration illustrated in FIG. 1A while omitting a part thereof.

FIG. 1A is a lateral-cross-sectional view illustrating one example of a cell. FIG. 1B is a bottom view of FIG. 1A and in which illustration of a part of configuration of a cell 1 such as an air electrode layer is omitted. Note that, a part of each configuration element of the cell 1 is illustrated in an enlarged manner.

The cell 1 illustrated in FIG. 1A is formed in hollow-plate-shaped and further elongated plate-shaped. As illustrated in FIG. 1B, the whole cell 1 in a side view is rectangular-shaped in which a length of a side in a length direction L is 5 cm to 50 cm and a length of a side in a width direction W perpendicular to the length direction is 1 cm to 10 cm, for example. A thickness of the whole cell 1 is 1 mm to 5 mm. Hereinafter, a thickness direction of the cell 1 may be referred to as "T".

As illustrated in FIG. 1A, the cell 1 includes a columnar support 2 having a pair of opposing flat surfaces n1 and n2, which is formed in hollow plate-shaped, for example; and an element part a that is arranged on the flat surface n1 of the support 2. The element part a includes a fuel electrode layer 3, a solid electrolyte layer 4, and an air electrode layer 5. Hereinafter, a first electrode layer and a second electrode layer will be respectively explained as the fuel electrode layer 3 and the air electrode layer 5. An inter-connector 6 is arranged on the flat surface n2 of the cell 1.

Moreover, the cell 1 includes a middle layer 7 arranged between the solid electrolyte layer 4 and the air electrode layer 5.

Hereinafter, configuration members constituting the cell 1 will be explained.

The support 2 includes therein gas flow paths 2a through which gas flows. The gas flow paths 2a are formed along a longitudinal direction of the support 2. The cell 1 illustrated in FIG. 1A includes the six gas flow paths 2a.

The support 2 has gas permeability so as to transmit fuel gas to the fuel electrode layer 3. The support 2 further has the conductivity so as to execute current collection via the inter-connector 6.

The support 2 may contain an iron-group metal component and an inorganic oxide, for example. The iron-group metal component may be Ni and/or NiO, for example. The inorganic oxide may be a specific rare earth oxide. The specific rare earth oxide may be a rare earth oxide containing at least one of elements, which is selected from a group consisting of Y, Lu, Yb, Tm, Er, Ho, Dy, Gd, Sm, and Pr, for example. As a specific example of the rare earth oxide, $Y_2O_3$, $Lu_2O_3$, $Yb_2O_3$, $Tm_2O_3$, $Er_2O_3$, $HO_2O_3$, $Dy_2O_3$, $Gd_2O_3$, $Sm_2O_3$, and $Pr_2O_3$ are exemplified. The support 2 containing such a rare earth oxide has a thermal expansion coefficient that is close to that of the solid electrolyte layer 4. A volume ratio between an iron-group metal component and an inorganic oxide in the support 2 may be Ni and/or NiO:rare earth oxide=35:65 to 65:35, for example. When the volume ratio between the iron-group metal component and the inorganic oxide is set to within such a range, it is possible to put a thermal expansion coefficient of the support 2 closer to that of the solid electrolyte layer 4 while maintaining well electric conductivity of the support 2.

In the cell 1 illustrated in FIG. 1A, the columnar (namely, hollow plate-shaped) support 2 is a plate-shaped body elongated in its standing direction, and includes the pair of opposing flat surfaces n1 and n2, and a pair of semicircular-shaped side surfaces m connecting the flat surfaces n1 and n2 with each other.

In order to provide the gas permeability, an open porosity of the support 2 may be within a range of equal to or more than 30%, particularly 35 to 50%. The electric conductivity of the support 2 may be equal to or more than 300 S/cm, particularly equal to or more than 440 S/cm.

A generally well-known material such as a porous conductive ceramic may be employed for the fuel electrode layer 3. The porous conductive ceramic may be $ZrO_2$ into which a rare earth element oxide is solid-dissolved, and Ni and/or NiO. For the rare earth oxide, for example, $Y_2O_3$ and the like may be employed. Hereinafter, $ZrO_2$ into which a rare earth element oxide is solid-dissolved may be referred to as stabilized zirconia. The stabilized zirconia includes a partially-stabilized zirconia.

The solid electrolyte layer 4 is an electrolyte that is a bridge for an electron between the fuel electrode layer 3 and the air electrode layer 5. Furthermore, the solid electrolyte layer 4 has gas shut-off properties for preventing leakage of fuel gas and gas containing oxygen. The solid electrolyte layer 4 may be formed of $ZrO_2$ into which 3 to 15 mol % of a rare earth element oxide is solid-dissolved, for example. The rare earth oxide may be $Y_2O_3$, for example. Note that another material may be employed as long as the above-mentioned features are ensured.

The air electrode layer 5 is not particularly limited as long as it is generally used. The air electrode layer 5 may be a conductive ceramic made of i.e. $ABO_3$ perovskite-type oxide, for example. Moreover, the $ABO_3$ perovskite-type oxide may be a composite oxide in which Sr and La coexist at A sites, for example. As an example of the composite oxide in which Sr and La coexist at A sites, $La_xSr_{1-x}Co_yFe_{1-y}O_3$, $La_xSr_{1-x}MnO_3$, $La_xSr_{1-x}FeO_3$, $La_xSr_{1-x}CoO_3$, and the like are exemplified. Note that x satisfies 0<x<1, and y satisfies 0<y<1. The air electrode layer 5 has gas permeability. An open porosity of the air electrode layer 5 may be within a range of equal to or more than 20%, particularly 30 to 50%, for example.

For the inter-connector 6, for example, a lanthanum-chromite perovskite-type oxide ($LaCrO_3$-type oxide) or a lanthanum-strontium-titanium perovskite-type oxide ((La, Sr) $TiO_3$-type oxide) may be employed. Each of the materials has conductivity, and is not decomposed even when being exposed to fuel gas (gas containing hydrogen and the like) or gas containing oxygen (air and the like).

The inter-connector 6 is dense so as to prevent leakage of fuel gas flowing through the gas flow paths 2a formed in the support 2 or gas containing oxygen flowing through an outside of the support 2. The inter-connector 6 may have a relative density of equal to or more than 93%, particularly equal to or more than 95%.

The cell 1 may include, between the inter-connector 6 and the support 2, an adhesion layer whose composition is similar to that of the fuel electrode layer 3. The adhesion layer eases difference in a thermal expansion coefficient between the inter-connector 6 and the support 2.

The middle layer 7 may be made of $CeO_2$-type sintered body containing a rare earth element oxide other than Ce. The $CeO_2$-type sintered body may have a composition indicated by a composition formula of $(CeO_2)_{1-x}(REO_{1.5})_x$. In the composition formula, RE is at least one selected from among Sm, Y, Yb, and Gd, and x is number that satisfies $0<x\leq 0.3$.

There presets a case where a component of the solid electrolyte layer 4 and a component of the air electrode layer 5 react with each other between the solid electrolyte layer 4 and the air electrode layer 5 so as to generate a reaction layer having a high electric resistance. The middle layer 7 prevents a component of the solid electrolyte layer 4 and a component of the air electrode layer 5 from reacting with each other. The middle layer 7 prevents Sr contained in the air electrode layer 5 and Zr contained in the solid electrolyte layer 4 from reacting with each other, for example. RE in the composition formula may be Sm or Gd. When RE is Sm or Gd, an electric resistance between the solid electrolyte layer 4 and the air electrode layer 5 is able to be reduced. The middle layer 7 may be $CeO_2$ into which 10 to 20 mol % of $SmO_{1.5}$ or $GdO_{1.5}$ is solid-dissolved, for example.

When the middle layer 7 is provided between the solid electrolyte layer 4 and the air electrode layer 5, the solid electrolyte layer 4 and the air electrode layer 5 hardly react with each other, so that a reaction layer having a high electric resistance is hardly generated. However, a component having a high electric resistance is generated due to reaction between $CeO_2$ contained in the middle layer 7 and $ZrO_2$ contained in the solid electrolyte layer 4. Hereinafter, the component having a high electric resistance may be simply referred to as a resistance component.

In the present disclosure, in order to improve power generation efficiently of the cell 1, not only an electric resistance between the solid electrolyte layer 4 and the air electrode layer 5, but also an electric resistance between the middle layer 7 and the solid electrolyte layer 4 is controlled.

In a boundary region between the solid electrolyte layer 4 and the middle layer 7, the cell 1 according to the present disclosure includes a point at which molarity of Ce and that of Zr are equal.

In the cell 1 according to the present disclosure, from a basing point at which molarity of Ce and that of Zr are equal, an average molarity of Ce within a range from the basing point up to 3 μm toward the solid electrolyte layer 4 may be equal to or less than 10 mol % with respect to a total of Ce, Zr, and other rare earth elements.

In other words, in the cell 1 according to the present disclosure, an average molarity of Ce within a range from the basing point positioned in the boundary region up to 3 μm toward the solid electrolyte layer 4 may be low, and thus an amount of a resistance component containing Ce and Zr close to the solid electrolyte layer 4 may be small. Hence, in the cell 1 according to the present disclosure, a resistance value is small in a boundary between the solid electrolyte layer 4 and the middle layer 7 so as to realize a high power generation efficiently.

Figure 2:
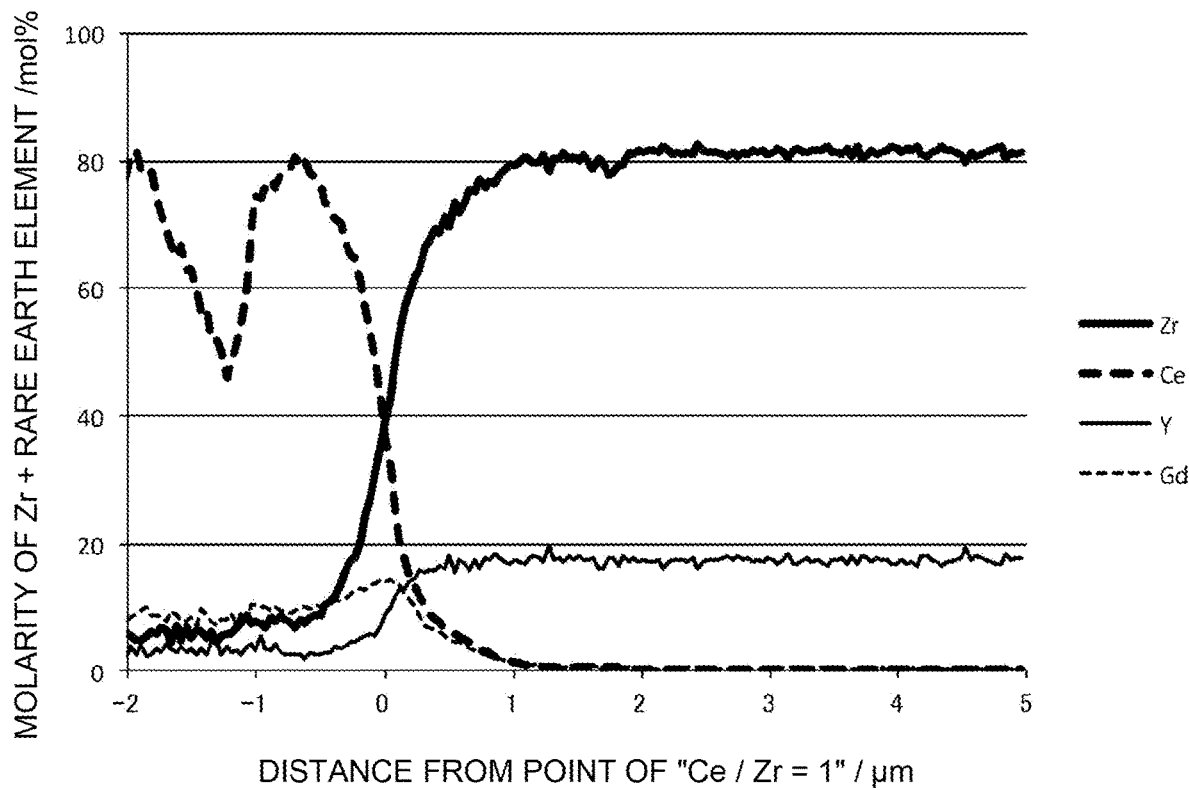
FIG. 2 is a diagram illustrating one example of result of quantitative analysis using energy dispersion X-ray spectroscopy, which is executed on a middle layer and a solid electrolyte layer of the cell.

FIG. 2 is a diagram illustrating one example of result of quantitative analysis using energy dispersion X-ray spectroscopy (Scanning Transmission Electron Microscope-Energy Dispersive x-ray Spectroscopy: STEM-EDS), which is executed on the middle layer 7 and the solid electrolyte layer 4 of the cell 1.

Specifically, there is illustrated a result that is obtained by executing quantitative analysis on a sample by using STEM-EDS, which is fabricated by using a Focused Ion Beam (FIB)-micro sampling method so as to include the air electrode layer 5, the middle layer 7, and the solid electrolyte layer 4 of the cell 1.

In the example illustrated in FIG. 2, an average molarity of Ce is equal to or less than 10 mol % with respect to a total of Ce, Zr, and other rare earth elements, within a range from a basing point at which molarity of Ce and that of Zr are equal up to 3 μm toward the solid electrolyte layer in a boundary region between the solid electrolyte layer 4 and the middle layer 7. Specifically, an average molarity of Ce within the above-mentioned range of the example illustrated in FIG. 2 is 4 mol %.

In the above-mentioned cell 1, an average molarity of Ce close to the solid electrolyte layer 4 is low, so that it is possible to reduce an amount of a resistance component containing Ce and Zr in a boundary region close to the solid electrolyte layer 4. Thus, a resistance value of the boundary region is hardly increased, so that it is possible to improve power generation efficiently.

In the cell 1 according to the present disclosure, an average molarity of Zr may be equal to or less than 70 mol % with respect to a total of Ce, Zr, and other rare earth elements, within a range from a basing point at which molarity of Ce and that of Zr are equal up to 3 μm toward the solid electrolyte layer 4 in a boundary region between the solid electrolyte layer 4 and the middle layer 7. Specifically, an average molarity of Zr within the above-mentioned range of the example illustrated in FIG. 2 is 77 mol %.

In the above-mentioned cell 1, an average molarity of Zr within a range from a basing point at which molarity of Ce and that of Zr are equal up to 3 μm toward the solid electrolyte layer is equal to or more than 70 mol %. In other words, within a range from the basing point up to 3 μm toward the solid electrolyte layer 4, diffusion of Zr from the solid electrolyte layer 4 toward the middle layer 7 is small. Thus, it is possible to reduce an amount of a resistance component containing Ce and Zr in the boundary region close to the middle layer 7. Thus, a resistance value of the boundary region is hardly increased, so that it is possible to improve power generation efficiently.

In a boundary region between the solid electrolyte layer 4 and the middle layer 7 of the cell 1 according to the present disclosure, a molarity ratio of Ce with respect to Zr within a range from a basing point at which molarity of Ce and that of Zr are equal up to 3 μm toward the solid electrolyte layer may be equal to or less than 0.143. Specifically, a molarity ratio of Ce with respect to Zr within the above-mentioned range of the example illustrated in FIG. 2 is 0.052.

In the above-mentioned cell 1, a molarity ratio of Ce with respect to Zr within a range from a basing point at which molarity of Ce and that of Zr are equal up to 3 μm toward the solid electrolyte layer is equal to or less than 0.143, and thus a resistance component containing Ce and Zr is hardly generated. Therefore, a resistance value of the boundary region is hardly increased, so that it is possible to improve power generation efficiently.

The above-mentioned middle layer 7 may be film-formed by using a physical/chemical vapor deposition method such as Pulsed Laser Deposition (PLD) and Ion Assist Deposition (IAD).

The middle layer 7 may be film-formed by using a material containing a composition whose composition formula is indicated by, for example, $(CeO_2)_{1-x}(REO_{1.5})_x$. In the composition formula, RE is at least one selected from among Sm, Y, Yb, and Gd, and x is a number that satisfies $0<x\leq0.3$.

Particularly, $CeO_2$ into which Gd or Sm is solid-dissolved may be employed. For example, a composition indicated by $(CeO_2)_{1-x}(SmO_{1.5})_x$ or $(CeO_2)_{1-x}(GdO_{1.5})_x$ may be employed. In the above-mentioned formula, x is a number that satisfies $0<x\leq0.3$. Moreover, in terms of reduction in an electric resistance, $CeO_2$ into which 10 to 20 mol % of $GdO_{1.5}$ or $SmO_{1.5}$ is solid-dissolved may be employed.

Specifically, when the middle layer 7 is formed on a predetermined surface of the solid electrolyte layer 4 by using the above-mentioned vapor deposition method and fired, the middle layer 7 of the cell 1 according to the present disclosure is able to be provided. Note that a thickness of the middle layer 7 may be 3 to 5 μm.

Hereinafter, a manufacturing method of the above-mentioned cell 1 will be explained.

Powder of an iron-group metal such as Ni or an oxide thereof, powder of a rare earth element oxide such as $Y_2O_3$, organic binder, and solvent are mixed to prepare body paste. Extrusion molding is performed on the prepared body paste to fabricate a support molded body, and the support molded body is dried. Note that a calcined body obtained by calcining a support molded body for 2 to 6 hours at 900 to 1000° C. may be used as the support molded body.

Next, for example, in accordance with a predetermined formulation composition, raw materials of NiO and $ZrO_2$ into which $Y_2O_3$ is solid-dissolved are weighed and mixed. Hereinafter, $ZrO_2$ into which $Y_2O_3$ is solid-dissolved may be referred to as YSZ. Furthermore, organic binder and solvent are mixed with the mixed powder to prepare slurry for a fuel electrode layer.

Slurry obtained by adding powder of $ZrO_2$ into which a rare earth element is solid-dissolved to toluene, binder, commercially available dispersing agent, etc. is formed into a body having a thickness of 7 to 75 μm by a method such as the doctor blade method to fabricate a sheet-like solid electrolyte layer molded body. The obtained sheet-like solid electrolyte layer molded body is coated with slurry for a fuel electrode layer so as to form a fuel electrode layer molded body, and then a surface on a side of the fuel electrode layer molded body is laminated on a support molded body. Note that a predetermined position of a support molded body may be coated with slurry for a fuel electrode layer to be dried, and then a solid electrolyte layer molded body coated with the slurry for the fuel electrode layer may be laminated on the support molded body.

Next, for example, material of an inter-connector layer (for example, $LaCrO_3$-type oxide powder), organic binder, and solvent are mixed to prepare slurry, and the slurry is formed in sheet-shaped so as to fabricate a sheet for an inter-connector. The fabricated sheet for the inter-connector is laminated on an exposed surface of a support molded body, on which a solid electrolyte layer molded body is not formed, so as to fabricate a laminated molded body.

Next, a debinding treatment is performed on the above-mentioned laminated molded body, and is fired for 2 to 6 hours at 1500° C. to 1600° C. under gas containing oxygen.

Next, a plurality of film layers containing Gd is formed on a surface of the solid electrolyte layer 4 by using the above-mentioned vapor deposition method so as to film-form a film to be the middle layer 7.

Specifically, during vacuum vapor deposition, a gas ion having approximately a few $10^2$ eV is irradiated to a substrate by using an ion gun, and by using kinetic energy of the gas ion, the middle layer 7 that is dendritically growing is broken and compressed so as to form a film. The gas ion may be $Ar^+$ ion or $O^{2-}$ ion, for example.

Note that a molded body of the middle layer 7 may be fired for 2 to 10 hours at 1000 to 1400° C.

Next, for example, the middle layer 7 is coated with slurry containing material for an air electrode layer such as $LaFeO_3$-type oxide powder, solvent, and pore forming material by dipping, etc. If required, a predetermined position of the inter-connector 6 may be coated, by dipping, with slurry containing material for P-type semiconductor layer, such as $LaFeO_3$-type oxide powder, and solvent, and further may be fired for 2 to 6 hours at 1000 to 1300° C., so as to manufacture the hollow-plate-shaped cell 1 having the structure illustrated in FIG. 1A. Note that hydrogen gas is then led to an inner part of the cell 1 to perform a reduction treatment on the support 2 and the fuel electrode layer 3. In this case, the reduction treatment may be performed for 5 to 20 hours at 750 to 1000° C., for example.

The cell 1 fabricated as described above includes, in a boundary region between the solid electrolyte layer 4 and the middle layer 7, a point at which a molarity of Ce and that of Zr are equal, and average molarity of Ce within a range from the point as a basing point up to 3 μm toward the solid electrolyte layer 4 is equal to or less than 10 mol % with respect to a total of Ce, Zr, and other rare earth elements.

Figure 3A:
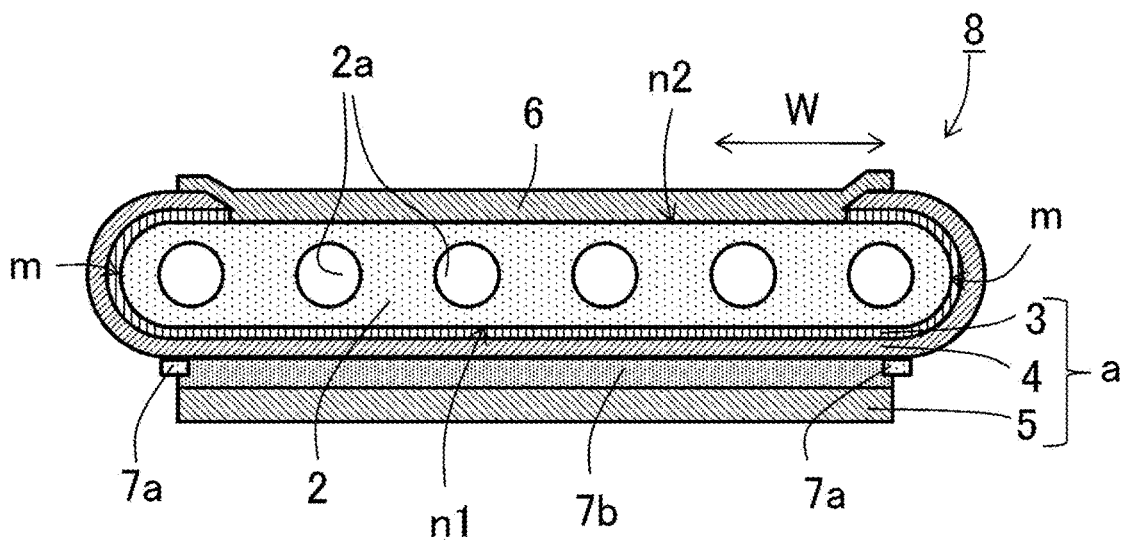
FIG. 3A is a lateral-cross-sectional view illustrating one example of the cell.

FIG. 3A is a lateral-cross-sectional view illustrating another example of the cell. FIG. 3B is a bottom view illustrating a configuration illustrated in FIG. 3A while omitting a part thereof.

A cell 8 according to the present disclosure illustrated in FIG. 3A includes a first middle layer 7a on the solid electrolyte layer 4 at both edge parts in the width direction W and at one edge part in the longitudinal direction L of the support 2. The cell 8 includes a second middle layer 7b that is arranged between the solid electrolyte layer 4 and the air electrode layer 5. In the top view, a part of the second middle layer 7b may be overlapped with the first middle layer 7a. Note that, in the present disclosure, in a boundary region between the solid electrolyte layer 4 and the middle layer 7, a region whose average molarity of Ce within a range from a point as a basing point at which molarity of Ce and that of Zr are equal up to 3 μm toward the solid electrolyte layer is equal to or less than 10 mol % with respect to a total of Ce, Zr, and other rare earth elements is arranged in a boundary region between the solid electrolyte layer 4 and the second middle layer 7b.

The first middle layer 7a may be arranged at positions in the cell 8 which need a high rigidity. Specifically, the first middle layer 7a may be arranged on a periphery of the element part a. As illustrated in FIG. 3B, for example, the first middle layer 7a may be formed to be arranged at both end parts of the cell 8 in the width direction W and extend in the longitudinal direction L of the cell 8. The first middle layer 7a may be arranged at a position in at least one of an upper end part and a lower end part of the cell 8 in the longitudinal direction L illustrated in FIG. 3B. In FIG. 3B, there is illustrated an example in which the first middle layer 7a is arranged at both end parts of the cell 8 in the width direction W and an upper end part of the cell 8. In other words, in FIG. 3B, there is illustrated an example in which the first middle layer 7a is formed in U-shaped. When the first middle layer 7a is additionally arranged at a lower end part of the cell 8, the first middle layer 7a may be formed in quadrilateral-shaped, for example.

The second middle layer 7b may be arranged at a position having large effects on power generation of the cell 1. In other words, the second middle layer 7b may be arranged at a part at which the solid electrolyte layer 4 and the air electrode layer 5 are overlapped with each other. In other words, in the top view, the second middle layer 7b may be arranged inside of the first middle layer 7a. Thus, an electric resistance between the solid electrolyte layer 4 and the air electrode layer 5 is able to be reduced.

Assume that in the top view, an outer-peripheral portion of the middle layer 7, in other words, a part of a boundary region which is overlapped with the first middle layer 7a is defined as a first boundary region, and a center portion of the middle layer 7, in other words, a boundary region that is overlapped with the second middle layer 7b is defined as a second boundary region. A content of Ce in at least a part of the first boundary region may be different from that of the second boundary region. When a point in the boundary region at which molarity of Ce and that of Zr are equal is defined as a basing point, the content of Ce in the boundary region may be average molarity of Ce within a range from the basing point up to 3 μm toward the solid electrolyte layer 4. Hereinafter, when a point in a boundary region at which molarity of Ce and that of Zr are equal is defined to be a basing point, average molarity of Ce within a range from the basing point up to 3 μm toward the solid electrolyte layer 4 may be simply referred to as a Ce content in the boundary region.

A Ce content in the second boundary region may be less than that in the first boundary region. In other words, in the solid electrolyte layer 4, a Ce content in the neighborhood of the second middle layer 7b may be less than that in the neighborhood of the first middle layer 7a.

When a Ce content in the second boundary region is less than that in the first boundary region, in the second boundary region having large effects on power generation, namely, in the neighborhood of the second middle layer 7b of the solid electrolyte layer 4, a component having a high electric resistance, which is generated by reaction between $CeO_2$ and $ZrO_2$, is hardly generated. As a result, an electric resistance of the second boundary region becomes small so as to improve power generation efficiently.

When a Ce content of the first boundary region is larger than that in the second boundary region, a bonding strength between the solid electrolyte layer 4 and the first middle layer 7a and the rigidity of the cell 1 in the corresponding part are able to be improved.

In the first boundary region, average molarity of Ce within a range from a basing point at which molarity of Ce and that of Zr are equal up to 3 μm towards the solid electrolyte layer may be larger than 10 mol % with respect to a total of Ce, Zr, and other rare earth elements.

Thus, a bonding strength between the solid electrolyte layer 4 and the first middle layer 7a and the rigidity of the cell 1 in the corresponding part are able to be improved.

For example, when the corresponding part on the solid electrolyte layer 4 is coated with $CeO_2$ having a different concentration, a Ce content of the first boundary region and that of the second boundary region are able to be different from each other. Furthermore, a diffusion amount of $CeO_2$ from the first middle layer 7a into the solid electrolyte layer 4 may be different from a diffusion amount of $CeO_2$ from the second middle layer 7b into the solid electrolyte layer 4.

In order to cause a diffusion amount of $CeO_2$ from the first middle layer 7a into the solid electrolyte layer 4 to differ from a diffusion amount of $CeO_2$ from the second middle layer 7b into the solid electrolyte layer 4, the first middle layer 7a may be fabricated by the following method, for example. The second middle layer 7b may be fabricated by the above-mentioned method.

Slurry may be fabricated by adding solvent and the like to raw material powder so as to manufacture the first middle layer 7a by using a printing method or a transfer method for print-coating the slurry. For example, a surface of the solid electrolyte layer 4 may be coated with slurry to be the first middle layer 7a, and then the solid electrolyte layer 4 and the first middle layer 7a may be simultaneously fired to fabricate the first middle layer 7a.

The second middle layer 7b may be formed, as a vapor deposition film, on a surface of the solid electrolyte layer 4 in which the first middle layer 7a is not arranged by the above-mentioned vapor deposition method, for example, and further the formed vapor deposition film may be fired.

Note that a part of the second middle layer 7b, for example, an outer-peripheral portion thereof may be overlapped with a part of the first middle layer 7a, for example, an inner-peripheral portion thereof. Thus, a gap is hardly formed between the first middle layer 7a and the second middle layer 7b. The part in which the first middle layer 7a and the second middle layer 7b are overlapped with each other may be arranged between the solid electrolyte layer 4 and the second middle layer 7b. A part of the first middle layer 7a whose bonding strength to the solid electrolyte layer 4 is high is arranged between the solid electrolyte layer 4 and the second middle layer 7b, and thus the second middle layer 7b is hardly exfoliated.

Note that a thickness of the first middle layer 7a may be 0.1 μm to 3.0 μm. A thickness of the second middle layer 7b may be 3 μm to 5 μm.

Note that each of the middle layer 7 illustrated in FIGS. 1A and 1B and the second middle layer 7b illustrated in FIGS. 3A and 3B may include a plurality of layers. In this case, a layer in the middle layer 7 and the second middle layer 7b which is closest to the solid electrolyte layer 4 may be formed by the above-mentioned vapor deposition method, and coating may be performed by using slurry fabricated by adding solvent and the like to raw material powder and may be simultaneously fired with the air electrode layer so as to form the other layers. Note that, in this case, a thickness of the middle layer 7 and the second middle layer 7b may be also 3 μm to 5 μm.

(Cell Stack Device and Module)

Figure 4:
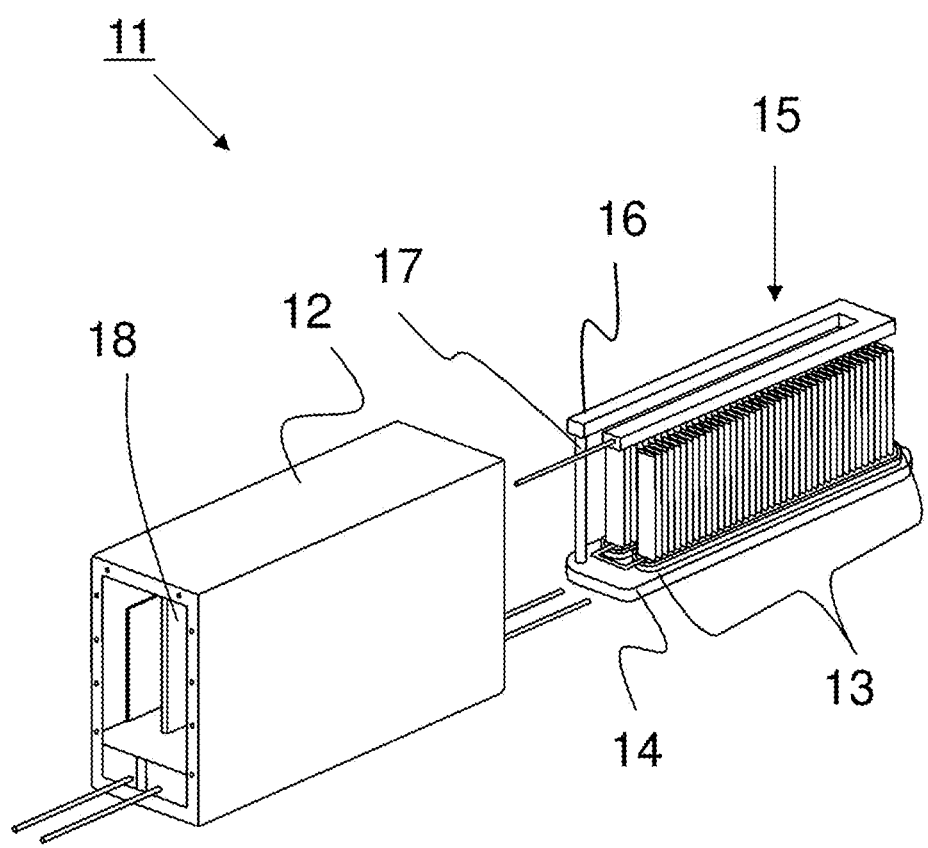
FIG. 4 is an exterior perspective view illustrating one example of a module.

FIG. 4 is an exterior perspective view illustrating one example of a module 11. The module 11 includes a storage container 12 and a cell stack device 15 that is housed in the storage container. The cell stack device 15 includes a cell stack 13 obtained by electrically and serially connecting the plurality of cells 1 according to the present disclosure via not-illustrated current collecting members.

In order to obtain fuel gas to be used in the cell 1, the module 11 may include a reformer 16 arranged on or above the cell stack 13, which reforms raw fuel such as natural gas and kerosene so as to generate fuel gas. Fuel gas generated by the reformer 16 is supplied to a manifold 14 via a gas flow tube 17, and is further supplied to a fuel-gas flow path 2a provided at an inner part of the cell 1 via the manifold 14.

The above-mentioned cell stack device 15 includes the cell stacks 13 in each of which the plurality of cells 1 having a high power generation efficiently is electrically and serially connected, and thus has a high power generation efficiently.

In FIG. 4, there is illustrated a state of the module 11 where a part (front and back walls) of the storage container 12 are removed, and the cell stack device 15 and the reformer 16 housed therein is moved therefrom in the back direction. In the module 11 illustrated in FIG. 4, the cell stack device 15 can be slid into the storage container 12 to be housed therein. Note that the cell stack device 15 may include the reformer 16.

The storage container 12 may include therein a gas-containing-oxygen leading member 18. In FIG. 4, the gas-containing-oxygen leading member 18 is arranged between the cell stacks 13 that are provided to the manifold 14 in parallel. The gas-containing-oxygen leading member 18 supplies gas containing oxygen to lower end parts of the cells 1 such that gas containing oxygen flows from lower end parts to upper end parts of the cells 1 in accordance with flow of fuel gas. The fuel gas exhausted from the fuel-gas flow paths 2a of the cells 1 and gas containing oxygen are burned in upper end parts of the cells 1 to raise temperature of the cells 1, so that it is possible to accelerate start-up of the cell stack device 15. The fuel gas exhausted from the fuel-gas flow paths 2a of the cells 1 and gas containing oxygen are burned in upper end parts of the cells 1, so that it is possible to warm the reformer 16 arranged on or above the cells 1 (cell stack 13). Thus, the reformer 16 is capable of efficiently performing reforming reaction.

The module 11 according to the present disclosure includes the cells 1 having high power generation efficiently, and thus the module 11 has high power generation efficiently.

(Module Housing Device)

Figure 5:
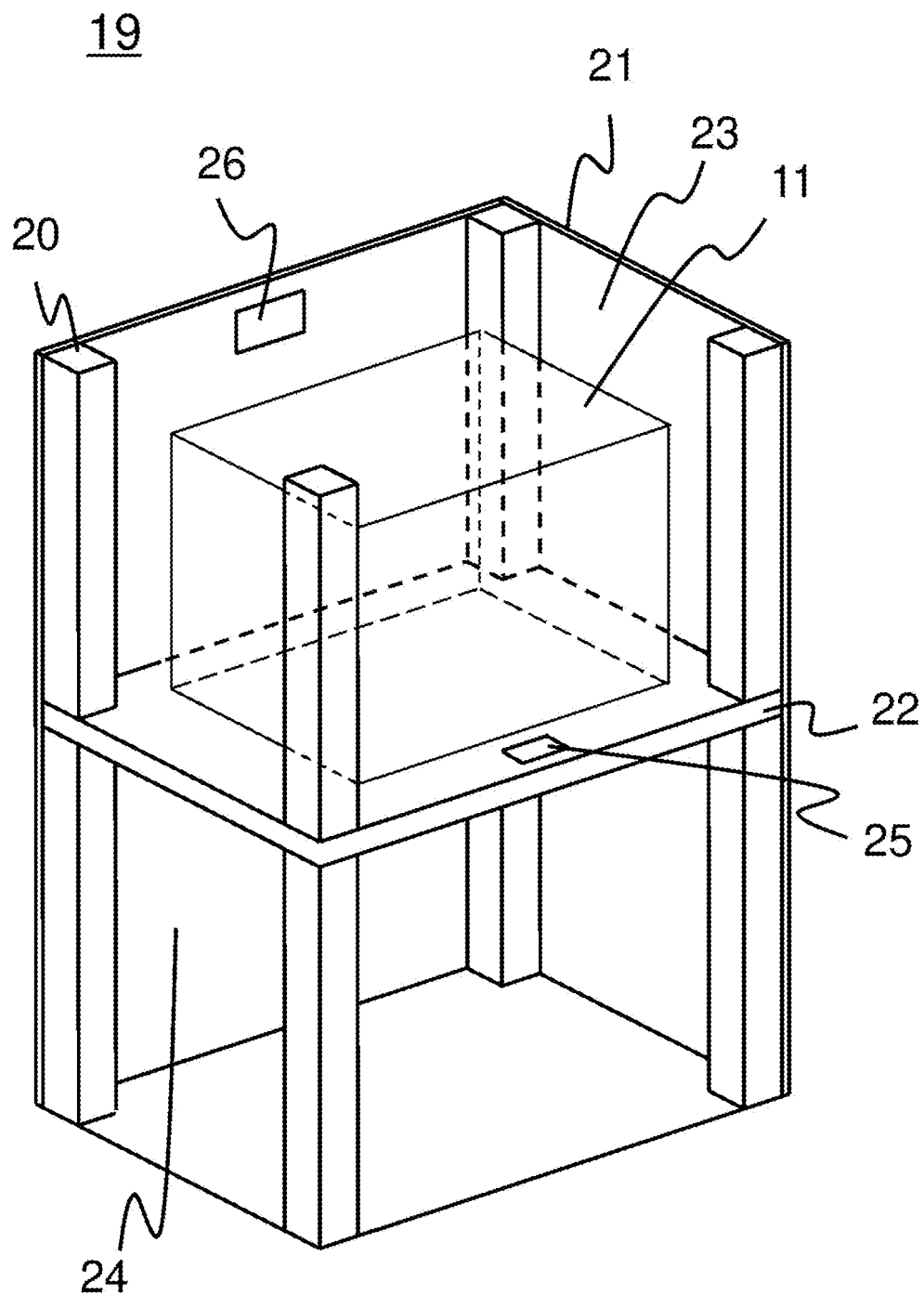
FIG. 5 is an exploded perspective view illustrating one example of a module housing device while omitting a part of configuration thereof.

FIG. 5 is an exploded perspective view illustrating an example of a fuel battery device as one example of a module housing device 19. The module housing device 19 includes an external case and a not-illustrated auxiliary equipment that drives the module 11 and the cell stack device 15 illustrated in FIG. 4 which are housed in the external case. Note that in FIG. 5, a part of configuration is omitted.

The external case of the module housing device 19 illustrated in FIG. 5 includes pillars 20 and external plates 21. An inner space of the external case is vertically divided by a partition plate 22. An inner space of the external case upper than the partition plate 22 is a module housing chamber 23 that houses therein the module 11, and an inner space of the external case lower than the partition plate 22 is an auxiliary-equipment housing chamber 24 that houses therein the auxiliary equipment for operating the module 11. Note that illustration of the auxiliary equipment housed in the auxiliary-equipment housing chamber 24 is omitted. The auxiliary equipment may include, for example, a water supplying device that supplies water to the module 11, a supply device that supplies fuel gas or air to the module 11, and the like.

The partition plate 22 includes an air vent port 25 through which air in the auxiliary-equipment housing chamber 24 flows into the module housing chamber 23. A part of the external plates 21 constituting the module housing chamber 23 includes an exhaust port 26 that exhausts air in the module housing chamber 23.

As described above, the above-mentioned module housing device 19 includes the module 11 having high power generation efficiently which is arranged in the module housing chamber 23, so as to have high power generation efficiently.

As described above, the present disclosure is specifically explained; however, the present disclosure is not limited to the above-mentioned embodiments, and various substitutions and changes in the form of the embodiments described herein may be made without departing from the spirit of the disclosure.

For example, in the above-mentioned embodiments, a fuel battery cell is explained while taking the hollow-plate-shaped support 2 as an example; however, the fuel battery cell may be a cylindrical cell. For example, in the embodiments, i.e. "vertically-striped" cell is employed; however, a horizontally-striped cell may be employed in which a plurality of power-generating element parts is arranged on a support substrate. In the above-mentioned embodiments, a fuel battery cell, a fuel battery cell stack device, a fuel battery module, and a fuel battery device are indicated as examples of "cell", "cell stack device", "module", and "module housing device"; however, may be an electrolytic cell, an electrolytic cell device, an electrolytic module, and an electrolytic device as other examples.

Practical Example

NiO powder whose average particle diameter was 0.5 μm and $Y_2O_3$ powder whose average particle diameter was 2.0 μm were mixed, and organic binder and solvent were added thereto so as to fabricate a body paste. The fabricated body paste was molded by an extrusion molding method, dried, and degreased so as to fabricate a conductive support molded body. The support molded body having received a reduction treatment contained 48 volume % of NiO and 52 volume % of $Y_2O_3$.

Next, $ZrO_2$ powder into which 8 mol % of $Y_2O_3$ was solid-dissolved was mixed with binder powder and solvent so as to fabricate slurry, and by using the slurry, a sheet for a solid electrolyte layer was fabricated by the doctor blade method. A particle diameter of $ZrO_2$ powder determined by the Microtrac method was 0.8 μm.

Next, NiO powder whose average particle diameter was 0.5 μm, $ZrO_2$ powder into which $Y_2O_3$ was solid-dissolved, organic binder, and solvent were mixed with together so as to fabricate slurry for a fuel electrode layer. The sheet for the solid electrolyte layer was coated with slurry for a fuel electrode layer by a screen printing method, and then dried to form a fuel electrode layer molded body that was a first laminated molded body.

The sheet-like first laminated molded body obtained by forming the fuel electrode layer molded body on the sheet for the solid electrolyte layer was laminated on a predetermined position on the support molded body while turning inward a surface of the sheet-like first laminated molded body which was close to the fuel electrode layer molded body, so as to obtain a second laminated molded body. A calcination treatment was executed on the obtained second laminated molded body for 3 hours at 1000° C. to fabricate a calcined body.

Subsequently, $La(Mg_{0.3}Cr_{0.7})_{0.96}O_3$ whose average particle diameter was 0.7 μm, organic binder, and solvent were mixed together to fabricate a slurry for an inter-connector layer. A part of a support in which the fuel electrode layer or the solid electrolyte layer was not formed, namely, a center portion of an exposed part of the support excluding both end parts of the calcined body of the solid electrolyte was coated with the fabricated slurry for the inter-connector layer so as to obtain a third laminated molded body.

The third laminated molded body was fired for 3 hours at 1500° C. in the atmosphere to obtain a laminated calcined body.

Next, a plurality of films to be a middle layer each containing Gd was formed on a surface of the solid electrolyte layer of the laminated calcined body by using an Ion Assisted Deposition (IAD) method included in the above-mentioned vapor deposition method. Specifically, during vacuum vapor deposition, gas ions of $Ar^+$ ion and $O^{2-}$ ion having approximately a few $10^2$ eV were irradiated to the substrate by using an ion gun, and by using kinetic energy of the gas ions, a film that was dendritically growing was broken and compressed so as to form the middle layer.

Next, the middle layer was coated with slurry containing material for an air electrode layer such as $LaFeO_3$-type oxide powder, solvent, and pore forming material by dipping, etc. Moreover, a surface of an inter-connector on an opposite side of the air electrode layer was coated, by dipping, with slurry containing $LaFeO_3$-type oxide powder that was a material to be a P-type semiconductor layer and solvent, and was fired for 4 hours at 1200° C. to fabricate a cell.

Note that a vacuum vapor deposition condition for the middle layer was appropriately adjusted so as to fabricate a plurality of cells whose molarities of various elements in boundary region were different from each other.

Comparison Example

As Comparison Example 1, a cell was prepared of which middle layer was fabricated by another method.

Specifically, a middle layer was formed by the following method on the laminated calcined body or the third laminated molded body on which the molded body to be the inter-connector layer was formed by a method same as the above-mentioned method according to Practical Example.

Composite oxide containing 85 mol % of $CeO_2$ and 15 mol % of $GdO_{1.5}$ was crushed by using a vibration mill or a ball mill while using isopropyl alcohol (IPA) as solvent. The obtained crushed powder was calcined for 4 hours at 900° C. A crush treatment was again performed on the calcined powder by using a ball mill, and the cohesion was adjusted to obtain a raw material powder for a middle layer molded body.

Subsequently, acrylic binder and toluene were added to raw material powder for a middle layer molded body, and they are mixed together to fabricate slurry for a middle layer. A calcined body of a solid electrolyte layer of the laminated calcined body or a solid electrolyte layer molded body of the third laminated molded body was coated, by a screen printing method, with the fabricated slurry for the middle layer so as to fabricate a middle layer molded body. Next, the above-mentioned middle layer molded body was fired for 3 hours at 1500° C. in the atmosphere along with the laminated calcined body or the third laminated molded body.

Subsequently, an air electrode layer was formed on the middle layer by a method same as the above-mentioned method according to Practical Example so as to fabricate a cell according to Comparison Example.

(Evaluation Method)

A power generation test was executed on the obtained cell so as to measure an actual resistance. The actual resistance was measured by an alternating current impedance method.

A sample was fabricated from the obtained cell by using a Focused Ion Beam (FIB)-micro sampling method so as to include therein an air electrode layer, a middle layer, and a solid electrolyte layer. Contents of Ce, Zr, and a rare earth element in the fabricated sample were measured by a Scanning Transmission Electron Microscope-Energy Dispersive Spectroscopy (STEM-EDS) quantitative analysis; there were calculated an average molarity of Ce, an average molarity of Zr, and a molarity ratio of Ce with respect to Zr within a range from a basing point at which molarity of Ce and that of Zr were equal up to 3 μm toward the solid electrolyte layer in a boundary region between the solid electrolyte layer and the middle layer; and results are indicated in Tables 1 to 3.

TABLE 1

| Sample No. | Average Molarity of Ce mol % | Actual Resistance mΩ |
|---|---|---|
| 1 | 3.65 | 9.94 |
| 2 | 7.00 | 12.50 |
| 3 | 7.28 | 15.50 |
| 4 | 10.00 | 16.39 |
| 5 | 12.05 | 18.45 |
| 6 | 16.11 | 23.89 |

TABLE 2

| Sample No. | Average Molarity of Zr mol % | Actual Resistance mΩ |
|---|---|---|
| 7 | 76.89 | 9.94 |
| 8 | 72.75 | 12.50 |
| 9 | 72.81 | 15.50 |
| 10 | 70.00 | 16.39 |
| 11 | 65.70 | 18.45 |
| 12 | 64.36 | 23.89 |

TABLE 3

| Sample No. | Molarity Ratio of Ce/Zr [-] | Actual Resistance mΩ |
|---|---|---|
| 13 | 0.047 | 9.94 |
| 14 | 0.096 | 12.50 |
| 15 | 0.100 | 15.50 |
| 16 | 0.143 | 16.39 |
| 17 | 0.183 | 18.45 |
| 18 | 0.250 | 23.89 |

According to result indicated in Table 1, in Samples No. 1 to 4 whose average molarity of Ce, with respect to a total of Ce, Zr, and other rare earth elements, within a range from a basing point at which molarity of Ce and that of Zr were equal up to 3 μm toward the solid electrolyte layer in a boundary region between the solid electrolyte layer and the middle layer was equal to or less than 10 mol %, actual resistances were equal to or less than 16.39 mΩ. In Samples No. 5 and 6 whose average molarity of Ce was larger than 10 mol %, respective actual resistances were high, namely, 18.45 mΩ and 23.89 mΩ. According to the result, it is possible to be recognized that Samples No. 1 to 4 have high power generation efficiently.

According to result indicated in Table 2, in Samples No. 7 to 10 whose average molarity of Zr, with respect to a total of Ce, Zr, and other rare earth elements, within a range from a basing point at which molarity of Ce and that of Zr were equal up to 3 μm toward the solid electrolyte layer in a boundary region between the solid electrolyte layer and the middle layer was equal to or less than 70 mol %, actual resistances were equal to or less than 16.39 mΩ. In Samples No. 11 and 12 whose average molarity of Zr was less than 70 mol %, respective actual resistances were high, namely, 18.45 mΩ and 23.89 mΩ. According to the result, it is possible to be recognized that Samples No. 7 to 10 have high power generation efficiently.

According to result indicated in Table 3, in Samples No. 13 to 16 whose molarity ratio of Ce, with respect to Zr, within a range from a basing point at which molarity of Ce and that of Zr were equal up to 3 μm toward the solid electrolyte layer in a boundary region between the solid electrolyte layer and the middle layer was equal to or less than 0.143, actual resistances were equal to or less than 16.39 mΩ. In Samples No. 17 and 18 whose molarity ratio of Ce with respect to Zr was larger than 0.143, respective actual resistances were high, namely, 18.45 mΩ and 23.89 mΩ. According to the result, it is possible to be recognized that Samples No. 13 to 16 have high power generation efficiently.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

The invention claimed is:

1. A cell comprising:
a first electrode layer;
a solid electrolyte layer on the first electrode layer, the solid electrolyte layer containing Zr;
a middle layer on the solid electrolyte layer, the middle layer containing $CeO_2$ which contains Ce and a rare earth element other than Ce;
a second electrode layer on the middle layer; and
a boundary region between the solid electrolyte layer and the middle layer, the boundary region including a basing point at which a molarity of the Ce and a molarity of the Zr are equal;
wherein in a top view, a part of the boundary region which is overlapped with an outer-peripheral portion of the middle layer is defined as a first boundary region, and another part of the boundary region which is overlapped with a center portion of the middle layer is defined as a second boundary region, and
a Ce content of at least a part of the first boundary region is different from a Ce content of the second boundary region.

2. The cell according to claim 1, wherein
an average molarity of the Ce within a range from the basing point up to 3 μm toward the solid electrolyte layer is equal to or less than 10 mol % with respect to a total of the Ce, the Zr, and the rare earth element.

3. The cell according to claim 1, wherein
an average molarity of the Zr within a range from the basing point up to 3 μm toward the solid electrolyte layer is equal to or more than 70 mol % with respect to a total of the Ce, the Zr, and the rare earth element.

4. The cell according to claim 1, wherein
a molarity ratio of the Ce within a range from the basing point up to 3 μm toward the solid electrolyte layer is equal to or less than 0.143.

5. The cell according to claim 1, wherein
the Ce content of the second boundary region is less than the Ce content of the first boundary region.

6. The cell according to claim 1, wherein
the middle layer includes:
a first middle layer arranged in an outer-peripheral portion of the middle layer; and
a second middle layer arranged inside of the first middle layer.

7. The cell according to claim 6, wherein
in a top view, a part of the second middle layer is overlapped with the first middle layer.

8. A cell stack device comprising:
a plurality of cells according to claim 1; and
a cell stack in which the plurality of cells is electrically connected.
9. A module comprising:
a storage container; and
the cell stack device according to claim 8 which is housed in the storage container.
10. A module housing device comprising:
an external case;
the module according to claim 9 which is housed in the external case; and
an auxiliary equipment configured to drive the module.

\* \* \* \* \*